United States Patent [19]

Tanaka et al.

[11] Patent Number: 4,771,520
[45] Date of Patent: Sep. 20, 1988

[54] METHOD OF PRODUCING LAMINATED CERAMIC CAPACITORS

[75] Inventors: Yukio Tanaka; Shin-ichi Takakuta; Shozo Kojima; Emiko Yamaguchi, all of Nagaokakyo, Japan

[73] Assignee: Murata Manufacturing Co., Ltd., Japan

[21] Appl. No.: 852,141

[22] Filed: Apr. 15, 1986

[30] Foreign Application Priority Data

Apr. 25, 1985 [JP] Japan .................................. 60-089329
Nov. 8, 1985 [JP] Japan .................................. 60-251192

[51] Int. Cl.⁴ ............................................... H01G 7/00
[52] U.S. Cl. ..................................... 29/25.42; 361/321
[58] Field of Search ............ 29/25.42; 361/321, 321 C; 264/58

[56] References Cited

U.S. PATENT DOCUMENTS 3,189,974 6/1965 Fabricius ............................. 29/25.42
4,086,649 4/1978 Hanold ................................ 29/25.42
4,586,972 5/1986 Yokotani et al. .................... 29/25.42

FOREIGN PATENT DOCUMENTS 2445086 5/1975 Fed. Rep. of Germany.
2657338 7/1977 Fed. Rep. of Germany.

Primary Examiner—P. W. Echols
Attorney, Agent, or Firm—Ostrolenk, Faber, Gerb & Soffen

[57] ABSTRACT

To obtain a plurality of laminated ceramic capacitors, in cutting a laminated body (14) formed of a plurality of ceramic green sheets (11) formed on their surfaces with electrically conductive films (12) to serve as internal electrodes, cutting is effected in such a manner that the electrically conductive films (12) are exposed on lateral surfaces (17), which are the surfaces that are not formed with external electrodes (22, 23). Then ceramic slurry (18) is applied to the lateral surfaces (17), thereby preventing the exposure of the internal electrodes (12) on the lateral surfaces (17) where connection to the external eletrodes (22, 23) is not desired. The invention makes effective use of the entire width of the ceramic layers forming the cut laminated body (16) so as to obtain electrostatic capacity in a space-efficient manner.

12 Claims, 9 Drawing Sheets

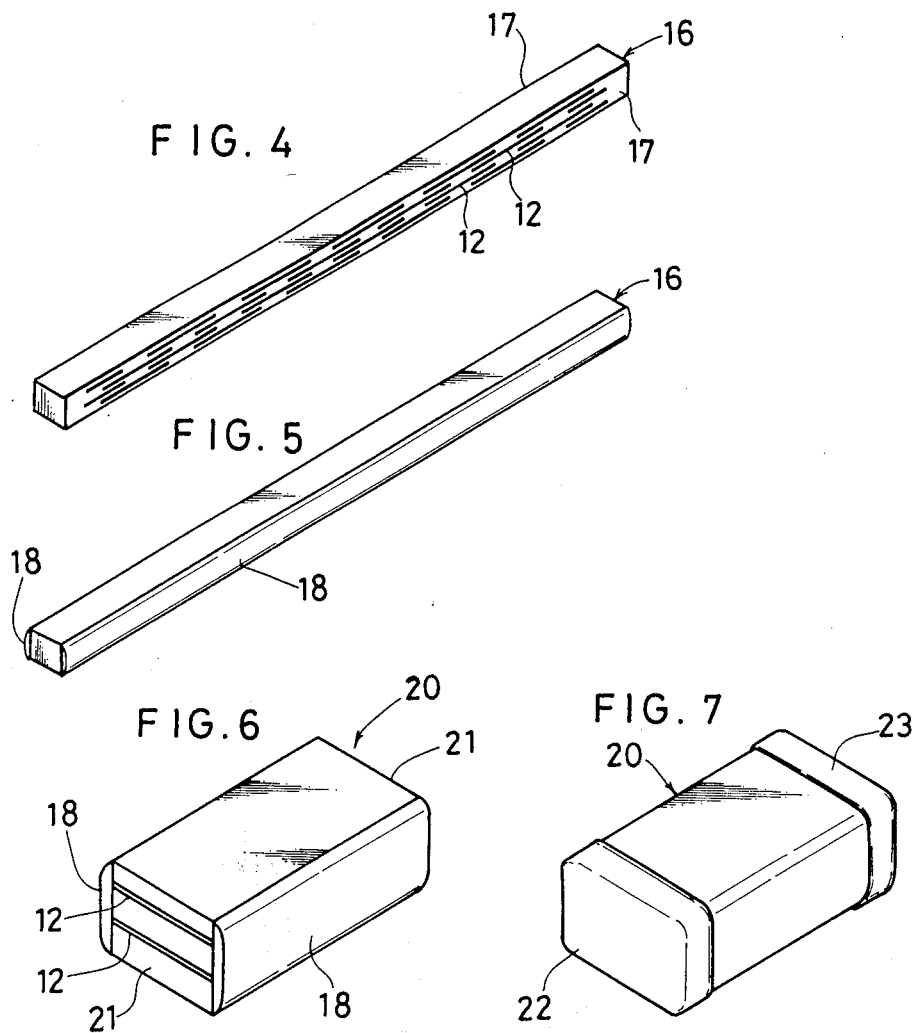

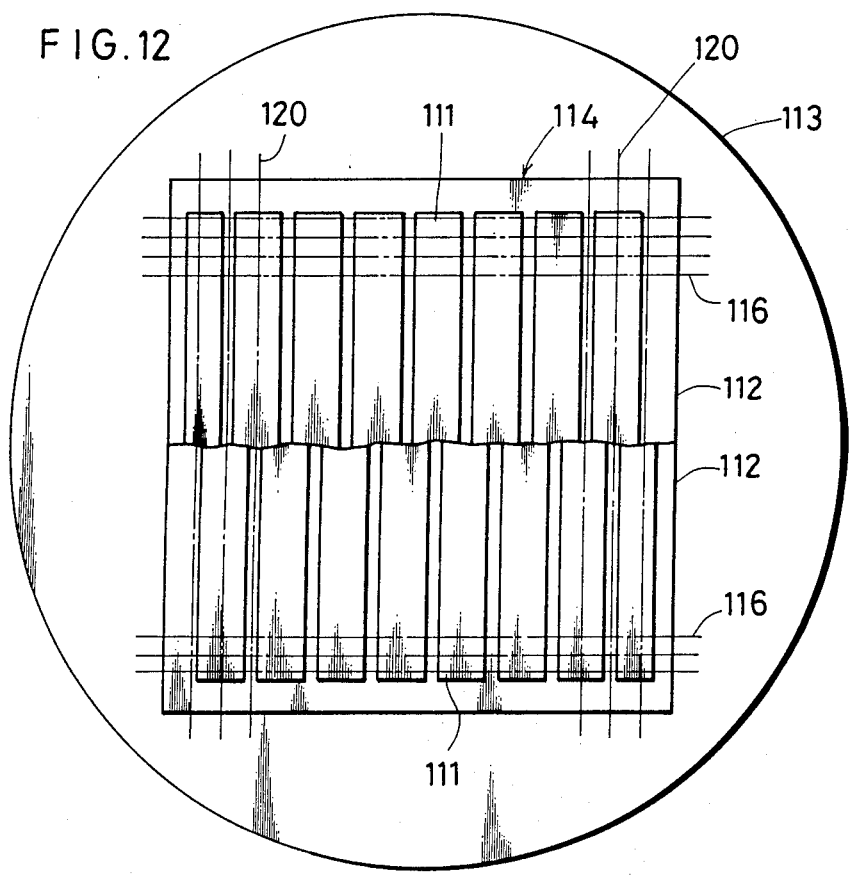

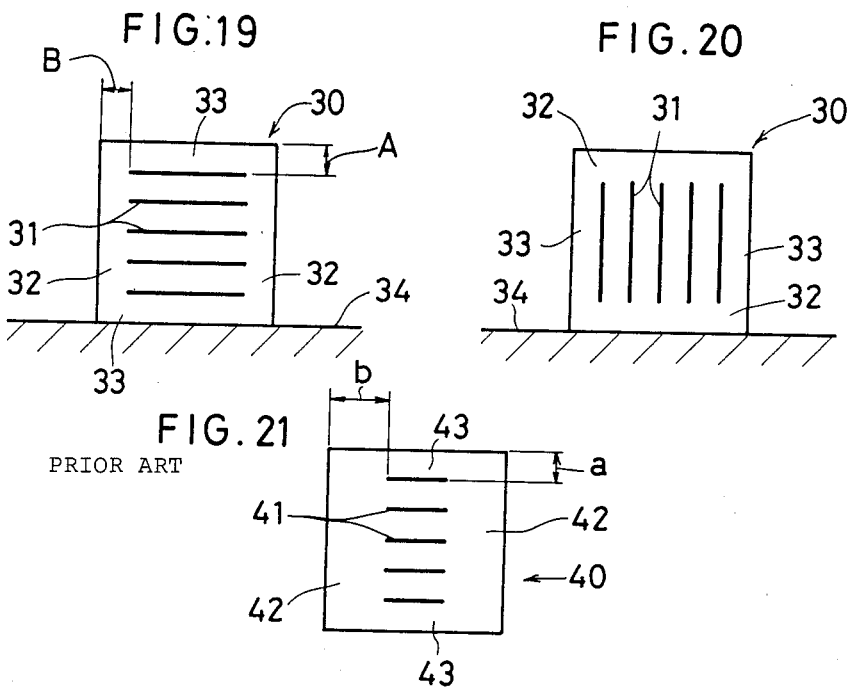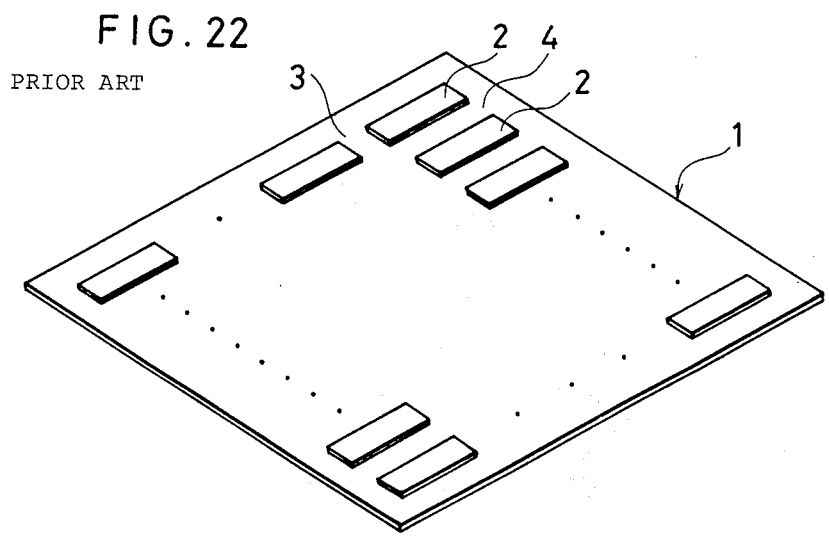

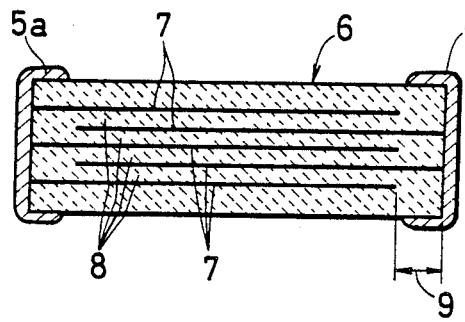
PRIOR ART FIG. 23
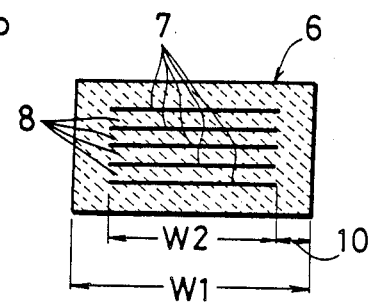
PRIOR ART FIG. 24
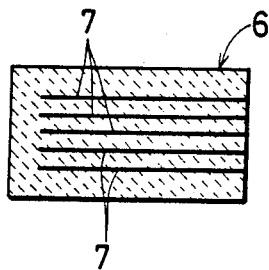
PRIOR ART FIG. 25
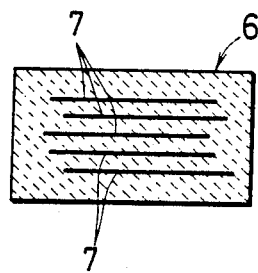
PRIOR ART FIG. 26

METHOD OF PRODUCING LAMINATED CERAMIC CAPACITORS

BACKGROUND OF THE INVENTION

1. Field of the Invention

This invention relates to a method of producing laminated ceramic capacitors.

2. Description of the Prior Art

Conventionally, in mass-producing laminated ceramic capacitors on a factory scale, a plurality of ceramic green sheets 1 as shown in FIG. 22 are prepared. A plurality of electrically conductive films 2 serving as internal electrodes are printed on each ceramic green sheet 1 leaving gaps 3 and 4 in longitudinal and transverse directions. A plurality of such ceramic green sheets 1 are laminated and then cut along longitudinally and transversely extending cutting lines and then fired. After they are fired, external electrodes 5 are applied thereto.

In laminating said ceramic green sheets 1, they are so arranged that the gaps on one ceramic green sheet 1 are disposed in alignment with the electrically conductive films 2 on another ceramic green sheet 1 in the direction of lamination (direction of thickness). When such laminated body is cut along cutting lines passing through the gaps 3 and 4, laminated chips 6 such as shown in FIGS. 23 and 24 are obtained. FIG. 23 is a longitudinal sectional view and FIG. 24 is a cross-sectional view.

As is clear from FIGS. 23 and 24, a plurality of internal electrodes 7 originating with said electrically conductive films 2 are formed inside each laminated chip 6, said internal electrodes 7 being opposed to each other and separated by ceramic layers 8 originating with said ceramic green sheets 1. Some of the internal electrodes 7 are connected to one external electrode 5a and the others to the other external electrode 5b. Therefore, at locations where connection to the external electrodes 5a and 5b is not desired, there are formed end margins 9 originating with the gaps 3, as shown in FIG. 23.

Further, as shown in FIG. 24, opposite sides of the internal electrodes 7 are formed with side margins 10 originating with the gaps 4. These side margins 10 are necessary for allowing the capacitor to withstand a higher voltage applied to the laminated ceramic capacitor from its surroundings and for preventing undesired shorting electrical connection to the external electrodes 5a and 5b.

To give a description by taking as an example the laminated ceramic capacitor described with reference to FIGS. 22–24, factors which determine the electrostatic capacity obtained by said capacitor include the area of overlapping regions of the internal electrodes 7. That is, the larger the area, the greater the electrostatic capacity.

However, because of the presence of the aforesaid end margins 9 and side margins 10, the total area of the ceramic layers 8 cannot be made to contribute to obtaining electrostatic capacity. Even if the laminated ceramic capacitor is reduced in size, the width of the end margins 9 and side margins 10 cannot be reduced in proportion thereto, and particularly in a small-sized laminated ceramic capacitor it is seen that the ratio of the width W2 of the internal electrodes 7 to the width W1 of the laminated chip 6, for example, as shown in FIG. 24, is reduced. As a result, the ratio of the effective overlapping area of the internal electrodes 7 to the overall area is extremely reduced, thus lowering the space efficiency of this process for obtaining a desired electrostatic capacity.

In addition, as described above, one of the reasons why the end margins 9 or side margins 10 cannot be reduced so much in the case of a small-sized laminated ceramic capacitor is as follows. Usually, the laminated chip 6 as shown in FIGS. 23 and 24 is obtained by preparing large ceramic green sheets 1 each having printed thereon electrically conductive films 2 in longitudinal and transverse rows serving as internal electrodes 7, as shown in FIG. 24, stacking said ceramic green sheets one upon another, and cutting the stack. Thus, when such steps are taken into account, it is necessary to take into account errors in the step of printing the electrically conductive films 2, the stacking step, and the cutting step. Thus, if the end margins 9 or side margins 10 are set with almost no tolerance for error and if said errors are accumulated, it is possible that the desired margins cannot be guaranteed to exist. For example, if the side margins 10 are smaller than a predetermined value, the internal electrodes 7 might sometimes be exposed to the lateral exterior surface of the laminated chip 6, as shown in FIG. 25, which is not desirable.

Thus, so long as the existing production method is employed, the end margins 9 and side margins 10 must be formed with as much allowance for errors as possible. For this reason, it has been impossible to avoid the aforesaid problem of reduced space efficiency of this process for obtaining a desired electrostatic capacity.

Further, due to a shift or variation in the printing of the electrically conductive films 2 or in the stacking of the ceramic green sheets 1 in FIG. 22, alignment of the internal electrodes 7 in the laminating direction would be degraded, as shown in FIG. 26, leading to a decrease in the overlapping area of the internal electrodes 7. This is also a cause of lowering the space efficiency with respect to the volume of the laminated chip 6 and results in producing a variation in electrostatic capacity among the products of laminated ceramic capacitors obtained.

SUMMARY OF THE INVENTION

Accordingly, an object of this invention is to provide a method of producing laminated ceramic capacitors which is capable of increasing the space efficiency with which a desired electrostatic capacity may be obtained and decreasing variations in electrostatic capacity of the products.

In a method of producing laminated ceramic capacitors wherein a laminated body with internal electrodes opposed to each other and separated by ceramic layers has formed at its opposite end surfaces first and second external electrodes, and wherein at said end surfaces a first group of said internal electrodes are connected to the first external electrode and a second group of said internal electrodes to the second external electrode, this invention is characterized by having the following steps:

(1) A first step of preparing a plurality of ceramic green sheets each formed with a plurality of electrically conductive films (12, 111) disposed in a first direction so that they are isolated from each other by gaps (13);

(2) A second step of preparing a laminated body by laminating said purality of ceramic green sheets in such one manner that said gaps on a ceramic green sheet are aligned with said electrically conductive films on another ceramic green sheet in the direction of lamination;

(3) A third step of cutting said laminated body in the direction of the thickness along at least one cutting line directed in said first direction to form a laminated block, thereby exposing the electrically conductive films on at least a first cut surface forming one lateral surface of the laminated block;

(4) A fourth step of covering said first cut surface with ceramic slurry;

(5) A fifth step of forming a laminated chip by cutting the laminated block having ceramic slurry applied thereto in a second direction intersecting said first direction along at least two cutting lines at positions between said gaps in the direction of the thickness, thereby exposing the electrically conductive films serving as said first group of internal electrodes and the electrically conductive films serving as said second internal electrodes, respectively, on a second cut surface forming opposite end surfaces of the laminated chip;

(6) A sixth step of firing said laminated chip; and (7) A seventh step of applying first and second external electrodes to the opposite end surfaces of said laminated chip.

In this invention, in cutting the laminated body of ceramic green sheets having formed therein electrically conductive films serving as the internal electrodes, a step is employed of forming cut surfaces to positively expose said electrically conductive films on the external surfaces where no external electrode is formed and then covering said cut surfaces with ceramic slurry. Therefore, there is no need of making allowance for the side margins 10 such as shown in FIG. 24 when forming the conductive films. Thus, since internal electrodes can be formed over the entire width of the laminated chip, if necessary, the space efficiency with which electrostatic capacity is obtained can be increased, and variation in the electrostatic capacity of the products can be reduced.

Further, according to this invention, miniaturization of laminated ceramic capacitors is possible. In the past, the minimum size that can be mass-produced has been considered to be 3.2×1.6×1.6 mm. According to this invention, however, 1.6×0.8×0.8 mm, 1.25×0.6×0.6 mm and 1.00×0.5×0.5 mm laminated ceramic capacitor chips can be obtained. Therefore, the invention contributes to densification of circuits and is suitable for use at high frequency. Particularly, a low voltage, miniature, large capacity laminated ceramic capacitor which is required as a decoupling element or bypass capacitor, as used in LSI integrated circuits, can be easily obtained.

Further, according to this invention, in the step of printing internal electrodes, the step of stacking ceramic green sheets and the step of cutting the stack, accuracy which is as high as in the past is not required, so that efficiency of production can be increased.

Further, according to this invention, since the dimension of the side margins for the internal electrodes present in the interior of the laminated chip can be made constant, there is almost no variation in the overlapping area of the internal electrodes among the products and hence a number of laminated ceramic capacitors of constant quality can be easily produced.

In a preferred embodiment of this invention, the aforesaid third and fourth steps are performed as follows. After the cutting performed in the third step, the positions of a plurality of laminated blocks are maintained unchanged. And in the fourth step, ceramic slurry which is to form side margins is filled into the cuts between the laminated blocks obtained as a result of the cutting, and is dried. Then, cutting is performed again to bisect the ceramic slurry filled in the cuts in the direction of the thickness, whereby there is obtained a state in which the divided slurry portions are attached to opposite lateral surfaces of said block.

According to the aforesaid preferred embodiment, ceramic slurry is filled in the cuts, so the ceramic slurry which is to serve as side margins can be reliably formed very thin. And when the ceramic slurry is bisected, further thinned ceramic slurry covers opposite lateral surfaces of the block to prevent exposure of opposite lateral edges of the internal electrodes.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a perspective view of a laminated block 16 obtained by performing the third step;

FIG. 5 is a perspective view showing the laminated block 16 having ceramic slurry 18 applied thereto by performing the fourth step;

FIG. 6 is a laminated chip 20 obtained by performing the fifth step;

FIG. 7 is a perspective view of the laminated chip 20 having undergone a firing step which is the sixth step and having external electrodes 22 and 23 applied thereto by the seventh step;

FIG. 11 is a front view showing ceramic dielectric layers 112 shown in FIG. 10 disposed one above the other to perform the second step;

FIG. 12 is a plan view of a laminated structure 114 obtained by performing the second step, with the uppermost ceramic laminated body 112 shown partly broken away;

FIGS. 19 and 20 are diagrammatic sectional views showing examples of how laminated ceramic capacitors according to this invention are mounted;

FIG. 21 is a view corresponding to FIGS. 19 and 20, being a diagrammatic sectional view of a conventional laminated ceramic capacitor;

FIG. 22 is a perspective view of a ceramic green sheet 1 used in a conventional method;

FIG. 23 is a longitudinal sectional view of a conventional laminated ceramic capacitor;

FIG. 24 is a cross-sectional view of the conventional laminated ceramic capacitor shown in FIG. 23; and FIGS. 25 and 26 are cross-sectional views of a laminated chip 6 for explaining drawbacks produced in the conventional laminated ceramic capacitor.

DESCRIPTION OF PREFERRED EMBODIMENTS

FIGS. 1 through 7 show successive steps for producing laminated ceramic capacitors according to an embodiment of this invention.

Figure 1:
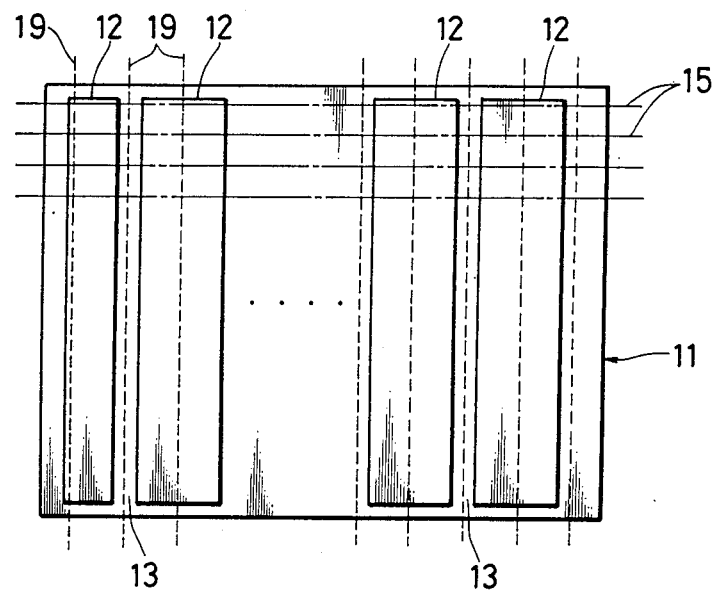
FIG. 1 is a plan view of a ceramic green sheet 11 prepared in the first step of a method of producing laminated ceramic capacitors according to an embodiment of this invention.

First, a plurality of ceramic green sheets 11 as shown in FIG. 1 are prepared. Each ceramic green sheet 11 is formed, as by printing, with a plurality of electrically conductive films 12 to serve as internal electrodes spaced from each other with gaps 13 and arranged in a first direction, i.e., transverse direction as seen in FIG. 1, and is then dried. In this embodiment, in order to simultaneously obtain a number of laminated ceramic capacitors, as will become clear from a description to be later given, the electrically conductive films 12 are formed so that they extend longitudinally in bands.

Figure 2:
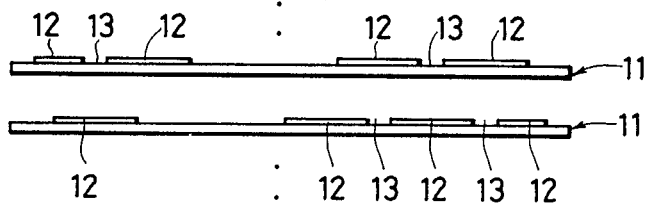
FIG. 2 is a front view showing the stacking of ceramic green sheets 11 performed in the second step.

After the printed electrically conductive films 12 have been dried, the ceramic green sheets 11 are laminated in a positional relation shown in FIG. 2. In this embodiment, a predetermined number of ceramic green sheets 11 are stacked in such a manner that the same ceramic green sheets 11 having the electrically conductive films 12 formed in the same pattern are alternately turned through 180 degrees in a horizontal plane to change their direction. In this stacked state, the gaps 13 on one ceramic green sheet 11 are aligned with the electrically conductive films 12 on the adjacent ceramic green sheets 11 (in this embodiment, substantially at the middle of the electrically conductive films 12) in the laminating direction. Further, a predetermined number of ceramic green sheets having no electrically conductive film are placed on the upper and lower sides of the thus laminated ceramic green sheets 11 according to the need.

Figure 3:
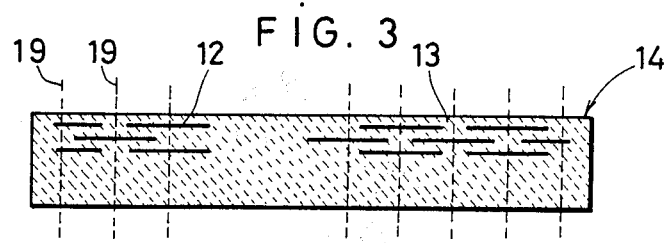
FIG. 3 is a sectional view of a laminated body 14 obtained by performing the second step.

The thus stacked ceramic green sheets 11, when pressed and thereby pressure bonded together, form a laminated body 14 as shown in FIG. 3. The positional relation between the electrically conductive films 12 and gaps 13 is diagrammatically shown within the laminated body 14.

The laminated body 14 shown in FIG. 3 is then cut in the direction of the thickness (direction of lamination) along transversely directed cutting lines 15 shown in FIG. 1, whereby long laminated blocks 16 as shown in FIG. 4 are formed. The cut surfaces 17 along the cutting lines 15 forming the lateral surfaces of such laminated block 16 have the electrically conductive films 12 exposed thereon.

Ceramic slurry 18 will then be applied to the opposite cut surfaces 17 of the laminated block 16, as shown in FIG. 5. The thickness of the ceramic slurry 18 is selected so that it will be about 50–200 $\mu$m, preferably about 50 $\mu$m, when the firing step to be later described is completed. In addition, the thickness of the ceramic slurry 18 can be accurately controlled by the printing or spray method.

It is desirable that the ceramic slurry 18 described above be the same ceramic material as that for the ceramic green sheets 11. That is, if the ceramic green sheets 11 and the ceramic slurry 18 are made of the same ceramic material, they can be fired under the same conditions in a single firing step to be later described so that no abnormal reaction takes place in the interface between the ceramic green sheets 11 and the ceramic slurry 18.

Further, it is preferable in connection with the binder used in the ceramic green sheets 11 that the binder contained in the ceramic slurry 18 be restricted to either the organic solvent type or water-soluble type. Then, if a binder of the organic solvent type such as polyvinyl alcohol or polyvinyl butyral is used in the ceramic green sheets 11, it is preferable for a water-soluble binder such as polyvinyl acetate to be used in the ceramic slurry 18. Or if, conversely, a water-soluble binder is used in the ceramic green sheets 11, it is preferable to use an organic solvent type binder in the ceramic slurry 18. The purpose is to ensure that the binder in the ceramic slurry 18 does not dissolve the binder in the ceramic green sheets 11.

The laminated block 16 shown in FIG. 5 is cut in the direction of the thickness along cutting lines 19 (FIG. 3). The cutting lines 19 are directed, in a longitudinal direction which is a second direction intersecting the aforesaid cutting lines 15 directed in the first (transverse) direction, at positions passing through the gaps 13. Thereby, laminated chips 20 as shown enlarged in FIG. 6 are obtained. On each of the cut surfaces 21 forming opposite end surfaces of such laminated chip 20, some of the electrically conductive films 12 serving as internal electrodes are exposed. In addition, the conductive films 12 exposed on one cut surface are different from those exposed on the other cut surface.

The laminated chip 20 such as shown in FIG. 6 is fired. And the fired laminated chip 20 is then formed at its opposite ends with external electrodes 22 and 23, as shown in FIG. 7. The external electrodes 22 and 23 can be formed by applying paste containing metal and then firing or by plating. When the external electrodes 22 and 23 are formed in this manner, a first group of internal electrodes provided by the electrically conductive films 12 formed in the laminated chip 20 are connected to the first external electrode 22 and a second group to the second external electrode 23, whereby a laminated ceramic capacitor is formed.

The characteristics of the laminated ceramic capacitor obtained in the manner described above will now be described in more detail in comparison with a conventional capacitor, with reference to FIGS. 8 and 9.

Figure 8:
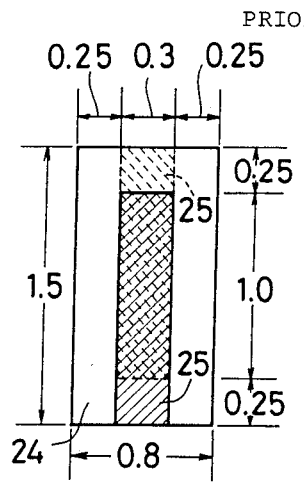
FIGS. 8 and 9 are diagrammatic views showing the dimensional relation between a ceramic portion 24 and internal electrodes 25 of a capacitor, to explain the effectiveness of the embodiment shown in FIGS. 1 through 7 in comparison with the prior art, FIG. 8 being prior art and FIG. 9 embodying the invention.

FIGS. 8 (prior art) and 9 (embodying the invention) each two-dimensionally show the dimensional relation between the ceramic portion 24 and the internal electrodes 25. In order to clarify the comparison of laminated ceramic capacitors having the same outer dimension, the outer dimensions of the planar form of the ceramic portion 24 is shown the same. The regions where the internal electrodes 25 are formed are hatched, while the internal electrodes 25 which are hidden in the ceramic portion 24 are shown in dotted lines. In addition, the dimensions entered in FIGS. 8 and 9 are in "mm".

As shown in FIG. 8, where it is desired to obtain a prior art small-sized laminated ceramic capacitor whose outer dimension of its planar form are as small as 1.5×0.8 mm, from the standpoint of printing accuracy and cutting accuracy, 0.25 mm has been allowed for side and end margins in production. Therefore, the ratio of the area of the overlapping portion of the internal electrodes 25 to the total area of the ceramic portion 24 is:

(1.0×0.3)/(1.5×0.8)=0.25, i.e., only 25%. In addition to this, the shift in the overlapping as shown in FIG. 26 must be taken into account; thus, actually said ratio has been as small as 22-23%.

Figure 9:
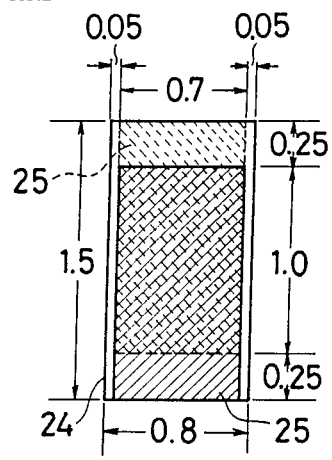

In contrast, in FIG. 9, the portion corresponding to each side margin measures only 0.05 mm which corresponds to the thickness of the ceramic slurry 18, so that said ratio is:

(1.0×0.7)/(1.5×0.8)=0.58, which means that about 2.5 times the electrostatic capacity can be obtained.

As for the variation in electrostatic capacity, the conventional 30% can be reduced to as low as 7-8%.

Besides the aforesaid embodiment, other embodiments are possible, as follows.

For example, in the step of forming the laminated block 16 shown in FIG. 4, while opposite lateral surfaces of the laminated block 16 have been formed by the cut surfaces 17 cut along the cutting lines 15, it is possible to form a first lateral surface of the laminated block 16 by a cut surface obtained as a result of cutting as described, but the second lateral surface can be formed by the end edges, not cut, of the ceramic green sheets.

Further, in a case where the first and second lateral surfaces are both formed by a cut surface, it is possible for the cutting on the side of said second lateral surface to be effected at such a position that the electrically conductive films which serve as the internal electrodes are not exposed. According to such embodiment, a form such as internal electrodes 7 shown in FIG. 25 will be obtained, but this case still has the advantage that at least one side margin 10 (FIG. 24) is eliminated, thus increasing space efficiency with which that electrostatic capacity is obtained as compared with the case of the side margins 10 being present on both sides of the internal electrodes, as in the prior art, and reducing variation in electrostatic capacity to some extent. In addition, in the case where the electrically conductive films are exposed on only one lateral surface of the laminated block, it goes without saying that the ceramic slurry has only to be applied to said one surface where said electrically conductive films are exposed.

FIGS. 10 through 18 show the successive steps included in a method of producing laminated ceramic capacitors according to a further embodiment of this invention.

Figure 10:
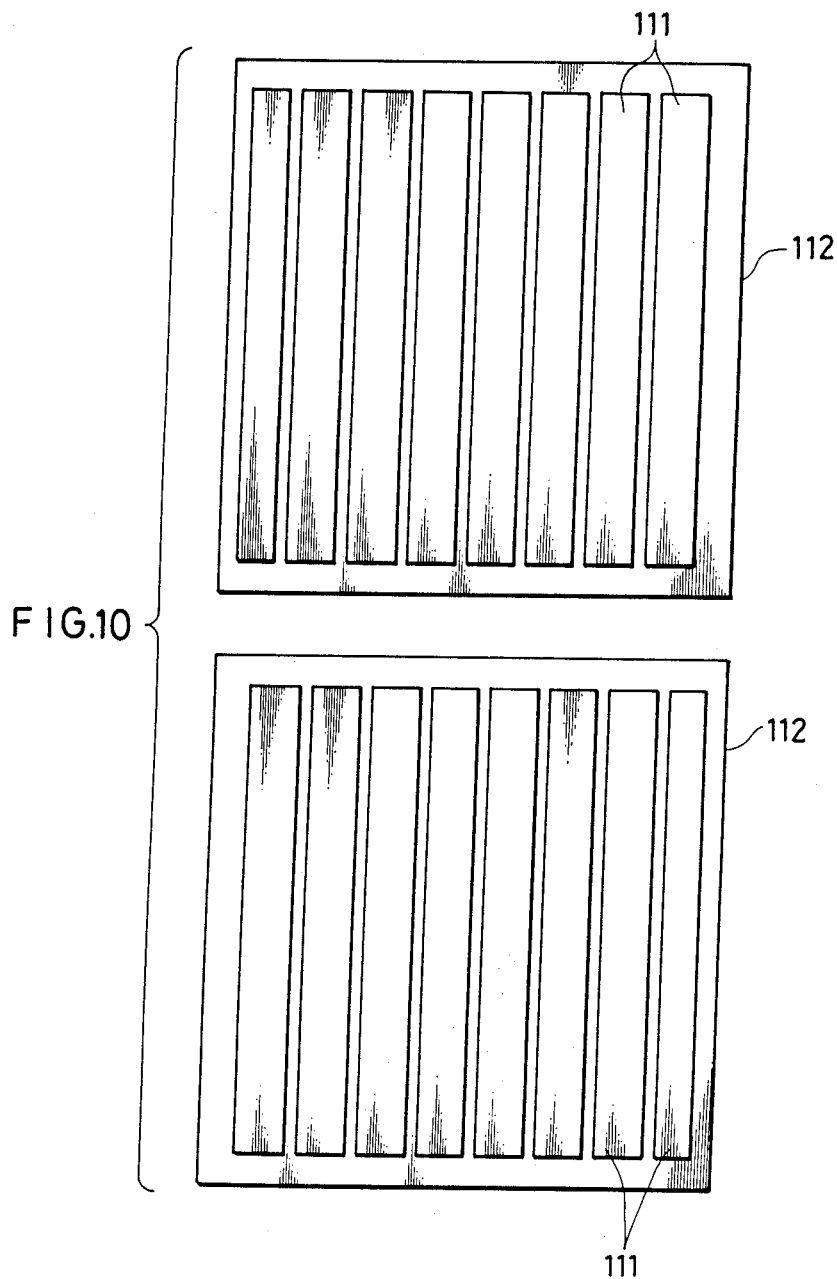
FIG. 10 is a plan view of a ceramic dielectric layer 112 formed with internal electrode patterns 111, showing the first step of a method of producing laminated ceramic capacitors according to another embodiment of this invention.

First, as shown in FIGS. 10 and 11, a plurality of ceramic green sheets, i.e., non-fired ceramic dielectric layers 112 each formed with internal electrode patterns 111 to serve as internal electrodes, are prepared. The internal electrode patterns 111, in this embodiment also, are disposed in longitudinal bands.

In FIGS. 10 and 11, the ceramic dielectric layer 112 shown above is the same as the ceramic dielectric layer 112 shown below, but the upper and lower ones are turned through 180 degrees relative to each other in the plane of the surface of the ceramic dielectric layers 112. That is, in the subsequent step, the upper and lower ceramic dielectric layers 112 are alternately stacked one upon another.

Figure 13:
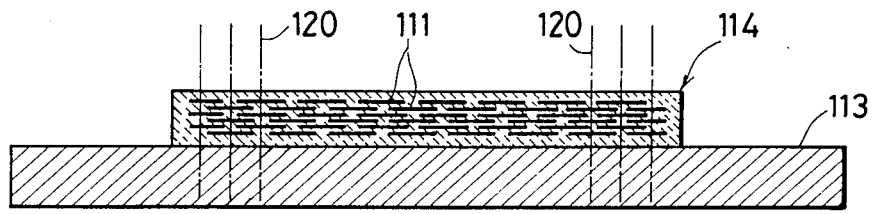
FIG. 13 is a sectional view of the laminated structure 114 shown in FIG. 12.

This stacking step is performed on a work table 113 as shown in FIGS. 12 and 13. After the stacking of the ceramic dielectric layers 112, they are pressed and thereby pressure bonded. In this state, the internal electrode patterns 111 are opposed to each other with the ceramic dielectric layers 112 interposed therebetween. In addition, as can be seen from FIGS. 11 and 13, positioning is so made that the spaces between the plurality of internal electrode patterns 111 formed on a given ceramic dielectric layer 112 are each opposed to substantially the middle of a particular internal electrode pattern 111 formed on the next ceramic dielectric layer 112.

A lamination structure 114 of said stacked and pressure bonded ceramic dielectric layers 112 is firmly fixed on the work table 113 as shown in FIG. 13 in performing the following steps. As for the means for this fixing, for example, wax is used.

Figure 14:
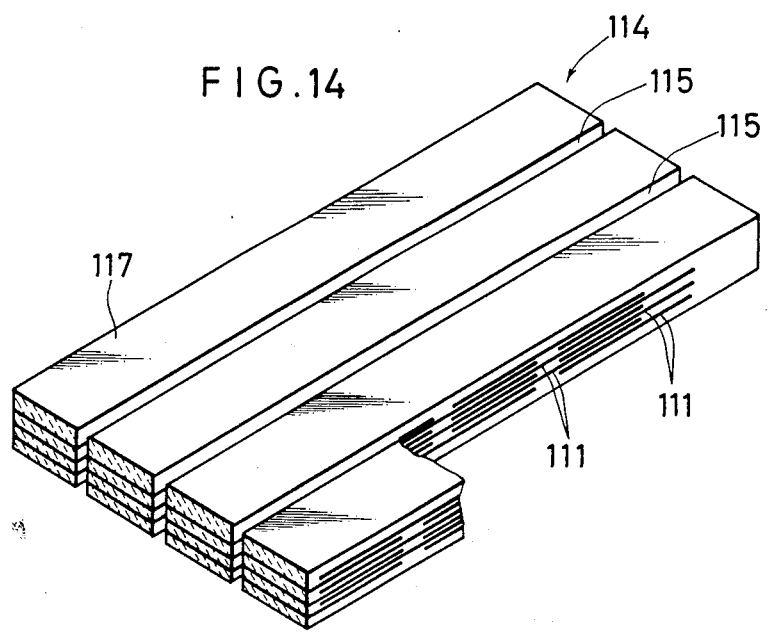
FIG. 14 is a perspective view, partly broken away, of the laminated structure 114 formed with cuts 115, showing the third step.

Then, as partly shown in FIG. 14, a plurality of transverse parallel cuts 115 are formed in the lamination structure 114 while the latter is held on the work table 113 (not shown). These cuts 115 are formed by cutting along a plurality of transverse cutting lines 116 shown in FIG. 12 using blades which are, e.g., about 300 μm thick. Thereby, a plurality of bar-like blocks 17 are obtained. Since the cutting lines 116 shown in FIG. 12 are at a position for cutting the internal electrode patterns 111, the internal electrode patterns 111 are exposed on each cut surface of each block 117 obtained. The end edges of these exposed internal electrode patterns 111 correspond to the end edges to be positioned adjacent the side margins (i.e., not having electrodes) internal electrodes of the resulting laminated ceramic capacitor.

Figure 15:
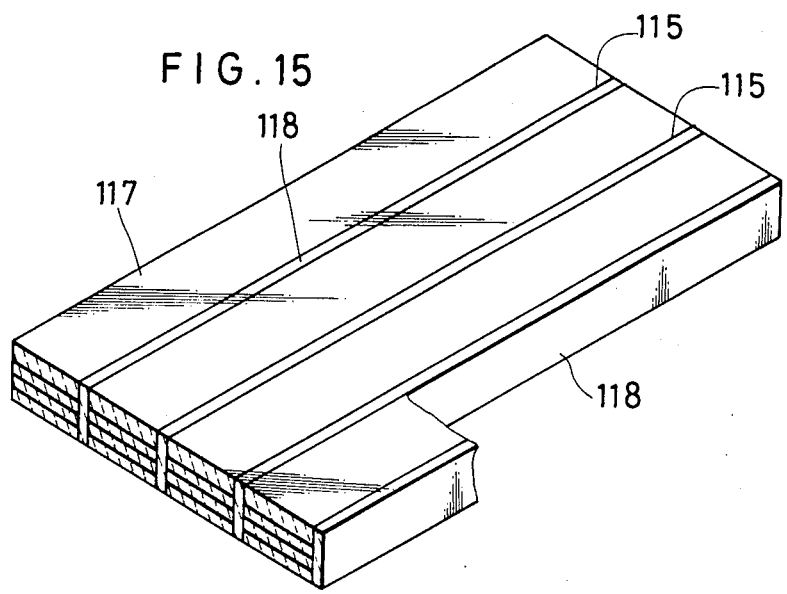
FIG. 15 is a perspective view, partly broken away, showing the cuts 115 of FIG. 14 filled with ceramic slurry 118, showing the fourth step.
Figure 16:
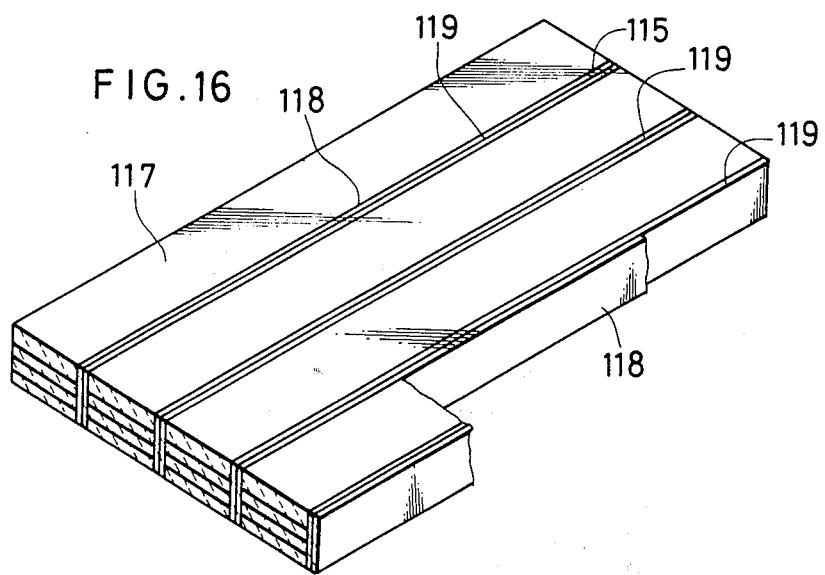
FIG. 16 is a perspective view, partly broken away, showing the ceramic slurry 118 of FIG. 15 bisected along a cutting line 119, showing the fifth step.

Then, ceramic slurry 118 to form side margins is filled into the cuts 15, as shown in FIG. 15, while they are held on the work table 113. It is preferable that this ceramic slurry 118 be the same ceramic material as that of the ceramic dielectric layers 112. In addition, in filling in the ceramic slurry 118, it is necessary to take care that air does not enter the cuts 115. To this end, useful methods that can be employed include pouring ceramic slurry under negative pressure, or blowing air, while pouring ceramic slurry in the direction of said air. It may also be contemplated to move blades with ceramic slurry sticking to the surface thereof through the cuts 115.

With the blocks 117 still held on the work table 113, the ceramic slurry 118 filled in the cuts 115 is cut again parallel to the cuts 115 so that it is divided into two. The cutting lines obtained are indicated by "119." This second cutting is effected by using blades which are thinner than those used for forming the cuts 115, for example, about 150-200 μm thick. In this manner, the ceramic slurry 118 is divided for reduction in thickness. The respective portions of the divided ceramic slurry 118 stick to opposite lateral surfaces of respective blocks 117.

Figure 17:
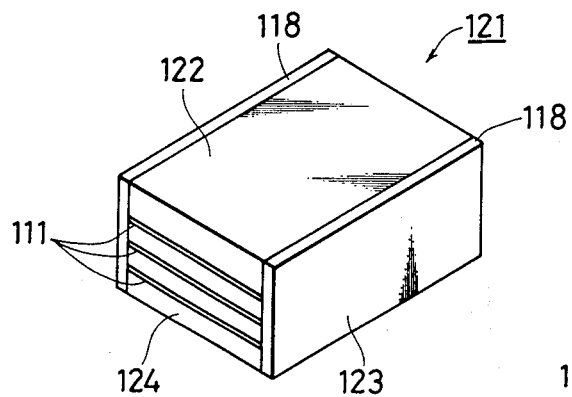
FIG. 17 is a perspective view of one ceramic laminated body 121 obtained by performing the cutting along cutting lines 120 (FIG. 12) applied to the block 117 of FIG. 16, showing the sixth step.

Then, cutting is effected with the direction changed by 90 degrees. That is, cutting along cutting lines 120 shown in FIGS. 11, 12 and 13 is effected. A non-fired ceramic laminated body 121 resulting from this cutting is shown enlarged in FIG. 17. As shown in FIG. 17, the ceramic laminated body 121 is in the form of a rectangular parallelpiped having upper and lower surfaces, opposite lateral surfaces and opposite end surfaces. In FIG. 17, the upper surface 122, one lateral surface 123 and one end surface 124 are shown. The lateral surface 123 results from said cutting along a cutting line 119. Further, the end surface 124 is formed by said cutting along a cutting line 120. In FIG. 17, particular ones of the internal electrode patterns 111 are exposed on the end surface 124, and, though not shown, the rest of the internal electrode patterns 111 are exposed on the opposite end surface. The internal electrode patterns 111 left in the interior of the ceramic laminated body 121 will serve as the internal electrodes of a laminated ceramic capacitor.

Figure 18:
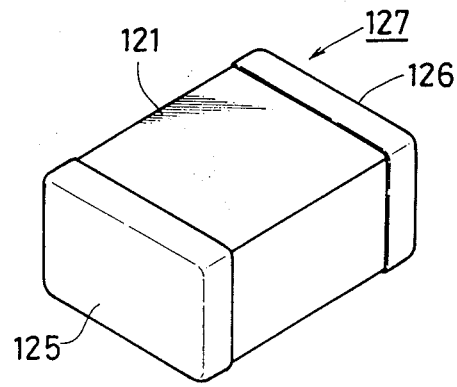
FIG. 18 is a perspective view of a laminated ceramic capacitor 127 obtained by undergoing the firing step which is the seventh step and forming the ceramic laminated body 121 of FIG. 17 with external electrodes 125 and 126 according to the eighth step.

The non-fired ceramic laminated body 121 is then fired. And, as shown in FIG. 18, the opposite end surfaces of the fired laminated body 121 are formed with external electrodes 125 and 126. The external electrodes 125 and 126 can be formed by the same method as in the aforesaid embodiment.

As shown in FIG. 18, the resulting laminating ceramic capacitor 127 is in the form of a chip. In this case, the aforesaid ceramic slurry 118 is integrally fired as part of the ceramic laminated body 121, forming the side margins for the internal electrode patterns 111 (internal electrodes) shown in FIG. 17.

In connection with the embodiments described so far, some modifications may be contemplated, as follows.

For example, the number of internal electrode patterns formed on each ceramic dielectric layer need not be plural. For example, in FIGS. 10 and 11, one internal electrode pattern 111 located, for example, at the rightmost position on each of the two ceramic dielectric layers 112 may be used to form a desired laminated ceramic capacitor.

Further, in the illustrated embodiment, all of the steps following the step of obtaining the laminated structure 114 shown in FIG. 12, up to the step for obtaining the non-fired ceramic laminated body 121, were performed throughout on the work table 113; however, at least the step of stacking a plurality of dielectric layers 120 to obtain a laminated structure 114, and the step of cutting along the cutting lines 120 to obtain ceramic laminated bodies 121, may be performed on a separate work table. As for the cutting for forming cuts 115 and the cutting for forming cutting lines 119, it is advantageous from the standpoint of reproducibility to perform them on the common work table 113; however, other means may be used to perform them on separate work tables so long as accurate cutting with good reproducibility is ensured.

As described above, according to the embodiment shown in FIGS. 10 through 18, side margins required for internal electrodes are formed by first forming cuts, then filling the cuts with ceramic slurry and then dividing the ceramic slurry filled in said cuts; therefore, side margins which are very narrow and reliable can be obtained.

In FIGS. 19 and 20, a laminated ceramic capacitor 30 according to this invention is shown in cross section. This laminated ceramic capacitor 30 is provided with a plurality of internal electrodes 31 and has side margins 32. In FIG. 21, a conventional laminated ceramic capacitor 40 is shown in cross section. This laminated ceramic capacitor 40 is provided with a plurality of internal electrodes 41 and has side margins 42.

These laminated ceramic capacitors 30 and 40 have a common dimensional feature that the cross section in which the side margins 32 or 42 appear is substantially a square. The thickness of the outermost ceramic layers 33 and 43 extending parallel to the internal electrodes 31 and 41 is indicated by "A" and "a", respectively. Further, the width of the side margins 32 and 42 is indicated by "B" and "b", respectively.

In the case of the conventional laminated ceramic capacitor 40, the thickness a is determined by the thickness of the ceramic green sheet and the number of such sheets laminated and hence can be made relatively small. Heretofore, the thickness a has been set, for example, to 100 $\mu$m. On the other hand, the width b, which, as described above, cannot be made so small, has been 250 $\mu$m or above.

In contrast, in the laminated ceramic capacitor 30 shown in FIGS. 19 and 20, the width B can be reduced to about 50–200 $\mu$m. Therefore, the width B can be made equal to the thickness A, and in said laminated ceramic capacitor 30, the thickness A and width B can both be 50–200 $\mu$m.

In FIGS. 19 and 20, a printed circuit board 34 is shown in an extremely simplified manner. In FIG. 19, the laminated ceramic capacitor 30 is mounted on the board 34 with its internal electrodes 31 directed parallel to the board 34. On the other hand, in FIG. 20, the laminated ceramic capacitor 30 is mounted on the board 34 with its internal electrodes 31 directed perpendicular to the board 34. When the cross section of the laminated ceramic capacitor 30 is substantially square and when the thickness A is equal to the width B, the mutual inductance induced between the wiring conductors (not shown) on the board 34 and the internal electrodes 31 is almost the same whether the laminated ceramic capacitor 30 is mounted as shown in FIG. 19 or FIG. 20. Therefore, if the laminated ceramic capacitor 30 is designed with the dimensional relation shown in FIGS. 19 and 20, it can be mounted in two manners without substantially changing the mutual inductance.

In contrast, in the laminated ceramic capacitor 40 shown in FIG. 21, since the thickness a differs from the width b, the mutual inductance induced between the internal electrodes 41 and the wiring conductors on the printed circuit board differs between a mounted state corresponding to FIG. 19 and a mounted state corresponding to FIG. 20, so that in mounting, the direction of the laminated ceramic capacitor 40 must be taken into account.

Although the present invention has been described and illustrated in detail, it is clearly understood that the same is by way of illustration and example only and is not to be taken by way of limitation, the scope of the present invention being limited only by the terms of the appended claims.

What is claimed is:

1. A method of producing laminated ceramic capacitors comprising a laminated body with internal electrodes opposed to each other and separated by ceramic layers, and having first and second external electrodes formed at its opposite end surfaces, and wherein at said end surfaces a first group of said internal electrodes are connected to the first external electrode and a second group of said internal electrodes are connected to the second external electrode, said method comprising:
- a first step of preparing a plurality of ceramic green sheets each formed with a plurality of electrically conductive films disposed in a first direction so that they are isolated from each other by gaps;
- a second step of preparing a laminated body by laminating said plurality of ceramic green sheets in such a manner that said gaps on a given ceramic green sheet are aligned with said electrically conductive films on another adjacent ceramic green sheet in the direction of lamination;
- a third step of cutting said laminated body in the direction of the lamination along at least one cutting line directed in said first direction to form a laminated block, thereby exposing the electrically conductive films at at least a first cut surface forming one lateral surface of the laminated block;
- a fourth step of covering said first cut surface with ceramic slurry;
- a fifth step of forming a laminated chip by cutting the laminated block having said ceramic slurry applied thereto in a second direction intersecting said first direction along at least two cutting lines at positions between said gaps, said cutting lines cutting said block in the direction of the lamination, thereby exposing the electrically conductive films serving as said first group of internal electrodes and the electrically conductive films serving as said second internal electrodes, at a pair of second cut surfaces forming opposite end surfaces of the laminated chip;
- a sixth step of firing said laminated chip; and
- a seventh step of applying first and second external electrodes to the opposite end surfaces of said laminated chip.

2. A method of producing laminated ceramic capacitors as set forth in claim 1, wherein in said third step, said laminated body is cut along at least a pair of said cutting lines, thereby exposing said electrically conductive films at a corresponding pair of opposite lateral surfaces of the laminated block,
said ceramic slurry being formed in such a manner as to cover said two lateral surfaces.

3. A method of producing laminated ceramic capacitors as set forth in claim 1, wherein said ceramic slurry is made of substantially the same material as that of said ceramic green sheets.

4. A method of producing laminated ceramic capacitors as set forth in the claim 3, wherein said third and fourth steps are performed on a common work table.

5. A method of producing laminated ceramic capacitors as set forth in claim 1, wherein one of the binders contained in said ceramic green sheets and said ceramic slurry is of the organic solvent type and the other is water-soluble.

6. A method of producing laminated ceramic capacitors as set forth in claim 1, wherein the laminated blocks obtained by cutting in the third step are maintained in the same positions after said cutting, and said fourth step is performed by filling the ceramic slurry into the cuts between the laminated blocks obtained as a result of the cutting, and then the ceramic slurry filled in the cuts is cut so that it is divided into two in the direction of the thickness, whereby the two divided ceramic slurry portions stick to the lateral surfaces of respective laminated blocks.

7. A method of producing laminated ceramic capacitors as set forth in claim 6, wherein the cutting in the third step and the cutting in the fourth step are performed using respectively different blades, the blade used in the fourth step being thinner than that for the third step.

8. A method of producing laminated ceramic capacitors as set forth in claim 1, wherein a given one of said plurality of ceramic green sheets having electrically conductive films thereon is substantially identical to an adjacent one of said plurality of ceramic green sheets having electrically conductive films thereon, one of said sheets being turned 180° relative to the other of said sheets in a plane parallel to said ceramic green sheets.

9. A method of producing ceramic laminated capacitors which comprise a ceramic laminated body in the form of a rectangular parallelepiped having an upper surface, a lower surface, opposite lateral surfaces and opposite end surfaces, external electrodes respectively being formed on said end surfaces, and
- a plurality of internal electrodes disposed inside the ceramic laminated body in opposed relation to each other between ceramic dielectric layers and extending to reach the end surfaces where said external electrodes are formed,
- each of said internal electrodes being connected to a respective one of the external electrodes, each said internal electrode being so formed that it leaves an end margin with respect to the end surface where said external electrode not connected to said internal electrode is formed, while leaving side margins with respect to the lateral surfaces of the ceramic laminated body, said method comprising:
- a first step of preparing a plurality of non-fired ceramic dielectric layers each formed with at least one internal electrode pattern to serve as said internal electrode,
- a second step of stacking said plurality of non-fired ceramic dielectric layers whereby said internal electrode patterns are disposed in opposed relation to each other between the ceramic dielectric layers,
- a third step of cutting along at least two substantially parallel lines said stacked ceramic dielectric layers and said internal electrode patterns, thereby obtaining a block having lateral surfaces adjacent side edges of said internal electrodes which are exposed on said lateral surfaces,
- a fourth step of covering the lateral surfaces of said block with ceramic slurry to form said side margins for said side edges of said internal electrodes,
- a fifth step of cutting the block having said ceramic slurry sticking to the opposite lateral surfaces thereof, said cutting being in a direction which intersects the direction in which said lateral surfaces extend, thereby obtaining said ceramic laminated body which is non-fired and has particular internal electrode patterns exposed on its end surfaces,
- a sixth step of firing said non-fired ceramic laminated body, and
- a seventh step of forming said external electrodes on the opposite end surfaces of said fired ceramic laminated body.

10. A method of producing laminated ceramic capacitors as set forth in claim 9, wherein said ceramic slurry is made of substantially the same ceramic material as that of said ceramic dielectric layers.

11. A method of producing laminated ceramic capacitors as set forth in claim 9, wherein one of the binders contained in said ceramic green sheets and said ceramic slurry is of the organic solvent type and the other is water-soluble.

12. A method of producing laminated ceramic capacitors as set forth in claim 9, wherein a given one of said plurality of ceramic green sheets having electrically conductive films thereon is substantially identical to an adjacent one of said plurality of ceramic green sheets having electrically conductive films thereon, one of said sheets being turned 180° relative to the other of said sheets in a plane parallel to said ceramic green sheets.

* * * * *

UNITED STATES PATENT AND TRADEMARK OFFICE
CERTIFICATE OF CORRECTION

PATENT NO. : 4,771,520

DATED : September 20, 1988

INVENTOR(S) : Yukio Tanaka et al.

It is certified that error appears in the above-identified patent and that said Letters Patent is hereby corrected as shown below:

ON THE TITLE PAGE:

List of Inventors, line 1, change "Takakuta" to --Takakura--.

Signed and Sealed this

Fourth Day of April, 1989

Attest:

DONALD J. QUIGG

*Attesting Officer*  *Commissioner of Patents and Trademarks*